United States Patent [19]

Haws

[11] 4,442,265

[45] Apr. 10, 1984

[54] POLYMERIC BLENDS

[75] Inventor: John R. Haws, Bartlesville, Okla.

[73] Assignee: Phillips Petroleum Company, Bartlesville, Okla.

[21] Appl. No.: 427,249

[22] Filed: Sep. 29, 1982

Related U.S. Application Data

[63] Continuation of Ser. No. 286,097, Jul. 22, 1981, Pat. No. 4,393,170, which is a continuation of Ser. No. 145,091, Apr. 30, 1980, abandoned.

[51] Int. Cl.³ .............................................. C08L 53/00
[52] U.S. Cl. .................................... 525/91; 524/499; 524/500; 524/505
[58] Field of Search .................. 525/91; 524/499, 500, 524/505

[56] References Cited

U.S. PATENT DOCUMENTS 3,652,720 3/1972 Wright .................................. 525/91
4,281,087 7/1981 Heuschen et al. .................... 525/91

Primary Examiner—J. Ziegler

[57] ABSTRACT

A polymeric blend containing (1) copolymer of lactone with conjugated diene or monovinylarene or both conjugated diene and monovinylarene, (2) acrylic ester polymer and (3) coumarone-indene resin.

18 Claims, No Drawings

POLYMERIC BLENDS

This application is a continuation application of my co-pending application, Ser. No. 286,097, filed July 22, 1981, now U.S. Pat. No. 4,343,170 which is a continuation application of my co-pending application, Ser. No. 145,091, filed Apr. 30, 1980, now abandoned.

BACKGROUND OF THE INVENTION

This invention relates to polymeric blends. In one of its aspects this invention relates to polymeric blends containing both acrylic ester polymer and coumarone-indene resin along with additional polymer. In another of its aspects this invention relates to blends containing conjugated diene-monovinylarene teleblock copolymers and at least two other types of polymer. In still another of its aspects this invention relates to blends containing copolymer of lactone with either conjugated diene or monovinylarene or with both conjugated diene and monovinylarene.

It is known that by combining various types of polymers to produce blends that desirable properties found in each of the components of the blend can sometimes be incorporated into a single composition. This is often a hit or miss proposition. In some instances, however, the blending of two or more polymers can produce desirable characteristics that are improved over the same characteristics of the individual components or even of blends of less than all of the components.

In the present invention the need for reasonably priced rubbery compositions having good cresent tear strength, good resistance to distortion at elevated temperatures, and good ozone and oil resistance has been met by producing polyblends of at least three different types of polymers.

It is therefore an object of this invention to provide novel combinations of polymers as rubbery polyblends having good cresent tear strength, good resistance to distortion at elevated temperatures, and good ozone and oil resistance.

Other aspects, objects, and the various advantages of this invention will become apparent upon reading this specification and the appended claims.

Statement of the Invention

According to this invention polyblends are provided containing as components: (1) at least one copolymer chosen from among (a) conjugated diene-monovinylarene teleblock copolymer and (b) copolymer of lactone with conjugated diene or monovinylarene or with both conjugated diene and monovinylarene, (2) acrylic ester polymer, and (3) coumaroneindene resin.

Conjugated diene-monovinylarene copolymer suitable for use in this invention is linear or branched teleblock copolymer well known in the art as elastomeric material which possesses thermoplastic characteristics; i.e., possesses high green tensile strength and can be molded into useful rubber objects without vulcanization.

Teleblock copolymer of this invention can be represented by the general formula I or II

wherein A represents a block of polymerized monovinylarene monomer, B represents a block of polymerized conjugated diene units or alternatively a random or random tapered block copolymer of conjugated diene and monovinylarene monomers, Y is the residual unit from a polyfunctional coupling agent or a polyfunctional initiating species and n has a value from 2 to 6.

Conjugated diene useful in the preparation of the linear and branched teleblock copolymers of this invention generally contain 4 to 12 carbon atoms per molecule, preferably contain 4 to 8 carbon atoms per molecule. Specific examples of useful conjugated diene include 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred is 1,3-butadiene due to its availability and favorable cost.

Monovinylarene monomer employed with the above described conjugated diene in linear and branched teleblock copolymer of this invention includes monomer containing from about 8 to 20 carbon atoms per molecule. Examples of specific monovinylarene monomer include styrene, α-methylstyrene, p-vinyltoluene, p-t-butylstyrene, and the like, and mixtures thereof.

Linear and branched teleblock copolymer of this invention can be prepared by techniques well known in the art. Such techniques are disclosed in U.S. Pat. Nos. 3,251,095, 3,281,383, and 3,639,521. Typical of such techniques are the sequential polymerization of monomer increments initiated by organomonolithium compounds followed by optional coupling with polyfunctional coupling agents, and the sequential polymerization of monomer increments initiated by organopolylithium compounds.

Preferred organolithium initiators are those which correspond to the general formula $R(Li)_y$, wherein R is a hydrocarbon radical selected from the group consisting of aliphatic, cycloaliphatic, and aromatic radicals and combinations thereof, and y is an integer from 1 to 4, inclusive. The R group has a valence equal to the integer y and preferably contains from 1 to 20, inclusive, carbon atoms, although it is possible to use high molecular weight compounds. Examples of suitable lithium-containing compounds within the scope of the above formula include methyllithium, isopropyllithium, n-butyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like. Other preferred catalyst includes reaction products between the compounds of the formula $R(Li)_y$ as disclosed hereinabove and one of divinylaromatics or trivinylaromatics containing 1 or 2 benzene rings or alkyl substiututed benzene rings, the total of the alkyl substituents on any di- or trivinylaromatic compound not exceeding 12 carbon atoms. Examples of suitable vinylaromatics for reaction with organolithium catalyst include divinylbenzenes, trivinylnaphthalenes, divinylbiphenyls, and the like. Also suitable are initiators such as a lithium-stilbene adduct and the reaction product of lithium with a methylnaphthalene and isoprene with the reaction product solubilized with butadiene (LIMI-B).

The amount of initiator used is broadly in the range of about 0.1 to about 2, preferably about 0.2 to about 1 gram milliequivalents per 100 grams of total monomers to be polymerized.

The polymerization is typically carried out in the presence of a diluent. Paraffins, cycloparaffins, and aromatic hydrocarbons each having from about 4 to about 10 carbon atoms per molecule inclusive, and mixtures thereof, are suitable.

The polymerization is typically carried out at temperatures which range from about 0° C. to about 200° C., more preferably from about 40° C. to about 125° C. The pressure is conveniently adjusted at a level sufficient to maintain the polymerization reaction mixture substantially in the liquid phase.

Conjugated diene-monovinylarene teleblock copolymer useful in this invention generally contains from 50 to 90, preferably from 55 to 80 weight percent polymerized conjugated diene units with the balance being polymerized monovinylarene units. Weight average molecular weights of the useful copolymers are generally in the range of about 50,000 to 1,000,000 preferably in the range of about 100,000 to 500,000.

Copolymer of lactone, conjugated diene and/or monovinylarene suitable for use in this invention is described generally In U.S. Pat. No. 3,764,639.

Lactone copolymer prepared using an active hydrogen-containing terminating agent, such as an acid or water, can be represented in its simplest form by the formula $D\text{-}(E)_x$ where D and E are polymer segments and x is an integer from 1 to 4. Prepared using monolithium initiator the lactone copolymer can be represented at least in part by the formula D—E. While the formula D—E will form the basis for the description of other polymeric structures which may arise during polymerization, it should be understood that the following discussion also applies to copolymer prepared using multichelic initiators, i.e., for polymer wherein x is 2 to 4. In these formulas, D is a polymer segment having one or more polymer blocks (including homopolymer, random, and random-tapered blocks) of one or more conjugated dienes with or without one or more monovinylarenes, and E is a polymer segment comprising one or more polymer blocks of one or more lactones. When the D segment comprises a copolymer of conjugated diene and monovinylarene, the conjugated diene to monovinylarene weight ratio can range from about 99:1 to about 1:99. It will be recognized by those skilled in the art that when mono- or dilithium initiator is employed, segment D will have a linear structure, and when a tri- or tetralithium initiator is employed, D will be branched, and the branches can have attached terminal polymer segments E. Furthermore, segment D will contain the residue of the organolithium initiator which is employed.

Following the formation of segment D, lactone or a mixture of lactones can be added directly to the polymerization mixture containing the preformed living polymer D—Li to give a living polymer which can have the structure D—E—Li, or, lactone or a mixture of lactones can be added after the living polymer is reacted with a capping agent such as an oxirane, aldehyde, epoxyaldehyde, polyaldehyde, ketone or epoxyketone, as described in U.S. Pat. No. 3,585,257 and U.S. Pat. No. 3,639,519, the disclosures of which are hereby incorporated by reference. When a capping agent is employed, the resulting polymer will contain a residue of the capping agent used.

It is currently believed that if the capping agent used is a coupling agent for the preformed D—Li polymer, as is the case, for example, for a compound having two or more oxirane groups, a polyaldehyde or an epoxyketone, or if no capping agent is added before the lactone (which itself can act as a coupling agent) is added directly to the preformed, non-capped living polymer, there can result a living polymer having the formula $(D)_n Z(Li)_n$, where D is as described previously, Z is the residue from one molecule of the capping-coupling agent or one molecule of the lactone monomer, and n is an integer having a maximum value equal to the number of living polymer segments A which can combine with the lactone monomer or the chosen capping-coupling agent. When Z is derived from the lactone monomer, n will have a maximum value of 2. The living polymer $(D)_n Z(Li)_n$ can initiate the polymerization of lactone monomer to give a branched polymer having up to n polylactone branches, i.e., $(D)_n Z(ELi)_m(Li)_{n-m}$, where E is block polylactone as described previously and m is zero or a positive integer from 1 to and including n. After termination with active hydrogen-containing terminating agent, such as an acid, an alcohol, or water, the resulting polymer can be represented by the formula $(D)_n Z(E)_m(H)_{n-m}$. It will be understood by one skilled in the art that, while not being shown, E will have a terminal hydrogen atom resulting from the reaction of $(ELi)_m$ with the active hydrogen-containing terminating agent, while the $(H)_{n-m}$ as shown above is connected directly to Z. There is also the possibility that a small amount of lactone homopolymer may be formed during polymerization as a result of basecatalyzed chain scission of D—E or $(D)_n Z(E)_m(H)_{n-m}$. The polymerized lactone composition can, therefore, consist of one or more polymers of the structures D—E, $(D)_n Z(E)_m(H)_{n-m}$, and E.

As used in this application, the formula $D\text{-}(E)_x$ is intended to encompass copolymers in which some coupling of the type described above has taken place.

In addition, the living polymers D—E—Li, and $(D)_n Z(ELi)_m(Li)_{n-m}$, as described previously, may be terminated with a coupling agent which can react with two or more of the lithium containing polymers discussed above to give a highly branched polymer matrix. These polymers are not easily represented by a single generic formula, and although not falling within the strictest interpretation, of $D\text{-}(E)_x$, these highly branched, coupled lactone copolymers are meant to be included, and are useful in the composition of this invention. Non-limiting examples of types of compounds which can serve as coupling agents include active halogen containing compounds, for example phenyltrichlorosilane, tetrachlorosilane, α,α'-dichloro-paraxylene, and the like. Presently preferred for the composition of this invention is lactone polymer which is branched as a result of coupling first employing ε-caprolactone monomer and further with phenyltrichlorosilane.

It is essential that the conjugated diene and/or monovinylarene monomer be polymerized first because the conjugated diene and/or monovinylarene polymer-Li structure or the polymer-OLi structure of the capped or coupled conjugated diene and/or monovinylarene block is believed to serve as the initiator for the polymerization of the lactone monomer. If the lactone monomer is polymerized first the lactone polymer-OLi structure does not provide a reactive site for the subsequent polymerization of the conjugated diene and/or monovinylarene thereby making it impossible to form the block copolymer.

Lactone block copolymer suitable for use in this invention can also be prepared in a multi-step process wherein conjugated diene or monovinylarene is polymerized to essentially quantitative conversion using a lithium-containing initiator. Each succeeding step can then involve the addition of a different conjugated diene or monovinylarene, or mixtures of these, which is polymerized to essentially quantitative conversion so that a block copolymer having two or more blocks is formed before the lactone is added. The addition and polymerization of a lactone, mixture of lactones, or successive increments of different lactones are the final steps prior to termination in the multi-step polymerization process. For the reason discussed above, it is essential in this process also that the conjugated dienes and monovinylarenes be polymerized first.

Copolymer of lactone, conjugated diene, and/or monovinylarene, which are suitable for the compositions of this invention are preferably prepared using a recipe in which lactone constitutes about 4 to 90 weight percent of the total monomers, preferably about 8 to 50 weight percent. It is estimated that, using the preferred recipe, the weight percent polymerized lactone in the block copolymer will range from about 2 to about 40 weight percent of the total polymerized monomers. When the D segment of the copolymer comprises a copolymer of conjugated diene and monovinylarene, the conjugated diene to monovinylarene weight ratio preferably ranges from about 99:1 to about 50:50. The molecular weight of lactone copolymer used in the composition of the invention, calculated on the basis of millimoles of initiator per 100 g of total monomer charge, should be broadly from about 5,000 to about 1,000,000, preferably from about 35,000 to about 150,000.

Conjugated diene containing 4 to about 12 carbon atoms per molecule and monovinylarene containing 8 to about 12 carbon atoms per molecule can be used for the preparation of the polymerized lactone compositions used in this invention. For example, suitable conjugated dienes include 1,3-butadiene, isoprene, piperylene, 6-phenyl-1,3-hexadiene, and mixtures of these. Examples of suitable monovinylarenes include styrene, α-methylstyrene, 4-methylstyrene, 4-isopropylstyrene, 2,4-dimethylstyrene, 1-vinylnaphthalene, 2-vinylnaphthalene, and mixtures of these.

Lactone monomer which can be employed to prepare lactone polymer for use in this invention can be represented by the formula

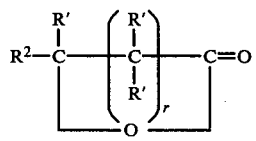

in which each R' is selected independently from hydrogen, alkyl, cycloalkyl, alkenyl, cycloalkenyl and aryl, and combinations thereof such as alkaryl and aralkyl; $R^2$ is selected from R', hydrogen, and a radical of the formula

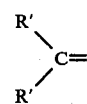

(when $R^2$ is the specified radical, no R' is attached to the carbon atom to which the radical is attached); the total number of carbon atoms in all the R' and $R^2$ substituents is within the range 0 to about 12; and r is 1, 3 or 4. Examples of lactones which can be used include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaprioic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of lactones can be employed.

Initiators and polymerization diluents suitable for preparing the lactone copolymers are the same as those described previously for use in preparing the conjugated diene-monovinylarene teleblock copolymers.

In the preparation of lactone block copolymer suitable for use in the invention wherein the copolymer contains three different polymer segments, one being a central polymer block of conjugated diene and/or monovinylarene and the other blocks being a polymer segment derived from the lactone, those lithium initiators which contain more than one active lithium atom per molecule are suitable. These initiators provide a central polymer segment of conjugated diene and/or monovinylarene having attached to the terminal ends of the polymer segment an active Li atom. Lactone polymerization at these terminal active ends leads to lactone teleblock copolymers.

When preparing block copolymer of this invention, the initiator level for the polymerization of conjugated diene and/or monovinylarene can vary widely but is generally in the range of from about 0.1 to about 20 gram millimoles per 100 grams of total monomers to be polymerized, i.e., all the conjugated diene and/or monovinylarene as well as all the lactone monomers. The initiator level is generally not changed when conjugated diene and/or monovinylarene have been polymerized to the desired extent and lactone is added for polymerization. The initiator level for the polymerization of conjugated diene and/or monovinylarene is generally the initiator level for the entire polymerization process.

When preparing lactone block copolymer, the polymerization conditions for polymerizing the D segment (the conjugated diene and/or monovinylarene block) include a temperature in the range of about 0° C. to about 200° C., preferably 40° C. to about 125° C. Capping agent, if used, can be added at the polymerization temperature used for the D segment. The E segment is polymerized at a temperature of about −20° C. to about 100° C., preferably about 0° C. to 70° C. The pressure is conveniently adjusted at a level sufficient to maintain the polymerization reaction mixture substantially in the liquid phase. The time for polymerization of the monomers of block D can be from about 1 minute to about 100 hours, and the time for polymerization of the monomers of block E can be from about 1 minute to about 100 hours. However, it is important that the combination of polymerization temperature and time for segment E (the polylactone block) be chosen so that conversion of monomer to polymer becomes quantitative essentially at the end of the chosen polymerization time. This is necessary to eliminate or greatly minimize the amount of polylactone degradation or scission which occurs as described previously after polymerization is complete.

Water, an aqueous solution of mineral acid, and carboxylic acid are among the preferred active-hydrogen containing terminating agents for use in the preparation of the lactone copolymers. Whereas mineral acids and lower carboxylic acids are typically added as dilute aqueous solutions, for example a 0.1 N solution, higher molecular weight solid carboxylic acids are typically added neat to the polymer cement.

Mineral acids which are suitable include but are not limited to hydrochloric acid, sulfuric acid, and phosphoric acid. The carboxylic acids are the aliphatic, alicyclic, aromatic, and heterocyclic di- and higher acids, and substituted derivatives thereof. Especially preferred, although not intended to be limiting, are the monocarboxylic acids having from about 2 to about 20 carbon atoms per molecule, for example, acetic acid, benzoic acid, capric acid, lauric acid, and stearic acid.

Ideally, and therefore preferably, the amount of acid to add is such that at least one equivalent weight of acid is added for each equivalent weight of organolithium initiator used to initiate the polymerization. It is within the scope of this invention to add excess acid although the amount added will not normally exceed about five equivalents by weight of acid per equivalent of organolithium initiator used.

Following termination of the polymerization reaction by the method described above, the lactone copolymer can be isolated by typical techniques such as coagulation with an excess of a non-solvent, such as isopropyl alcohol, or by steam stripping, followed by drying of the copolymer. Antioxidant can be added to the polymerization mixture after polymerization termination is complete and prior to polymer isolation and drying.

The acrylic ester polymers suitable for use in this invention include polymers and copolymers of alkyl, haloalkyl, and alkoxy alkyl acrylates and methacrylates, or mixtures, with monoolefins and vinyl monomers. Examples of suitable alkyl groups include methyl, ethyl, n-butyl, n-decyl, and the like; suitable haloalkyl groups include, among others, 1,1-dihydroperfluorobutyl and 3-perfluoromethoxy-1,1-dihydroperfluoropropyl; suitable alkoxy alkyl groups include methoxyethyl and ethoxyethyl. Ethylene is an example of a suitable monoolefin comonomer, and 2-chloroethyl vinyl ether, allyl glycidyl ether, vinyl chloride, vinylidine chloride, vinyl acetate, acrylonitrile, and styrene are suitable vinyl monomers. Presently preferable are the acrylic elastomers, such as poly(ethyl acrylate) or poly(butyl acrylate), i.e., rubber polymers which contain a predominant amount of a poly(acrylic ester), in the polymer chain. Suitable examples include the Hycar$^R$ polyacrylic rubbers manufactured by B. F. Goodrich Chemical Company, such as Hycar 4021, a copolymer prepared from a major amount of an acrylate ester and a minor amount of a vinyl monomer which contains chlorine.

Coumarone-indene resin suitable for use in the blends of this invention generally can include those resins obtained through catalytic polymerization of coal-tar naphthas. Such coal-tar naphthas contain resin-forming materials, for example, styrene, coumarone, indene, methyl coumarones, methyl indenes, dimethylcoumarones, dicyclopentadiene, methyl cyclopentadienes, cyclohexadienes, naphthalene, and anthracene derivatives. Polymerization of these resin-forming materials is effected by the catalytic action of a Bronsted acid, such as sulfuric acid or a derivative thereof, or of a Lewis acid, such as stannic chloride, antimony pentachloride, aluminum chloride, titanium tetrachloride, or boron trifluoride, on the coal tar naphthas. The polymers, generally, are not homopolymers, but are derived from mixtures of several resin-forming materials. The polymers may also be condensed with phenol and derivatives thereof, or with lower aliphatic aldehydes such as formaldehyde, or may be hydrogenated to remove residual unsaturation. The hydrocarbon resins described above and in Chapter 3 of the book "Synthetic Resins and Rubbers", by P. O. Powers, are well known to those skilled in the art. These resins are commonly used in the plasticization of rubbers, and in the manufacture of varnishes and paints. Such hydrocarbon resins are readily available on a commercial bases and include, for example, polyindenes, polycoumarones, coumarone-indene polymers, phenol-modified coumarone-indene polymers, coumarone-indene-styrene polymers, styrene-cyclopentadiene polymers, styrene-indene polymers, dicyclopentadiene resins, terpene resins, naphthalenic resins, anthracenic resins, and the like.

The polymeric blends of this composition can be broadly described as (1) about 15 to about 90 weight percent, preferably about 30 to about 70 weight percent of at least one of (a) conjugated dienemonovinylarene teleblock copolymer or (b) copolymer of lactone with conjugated diene and/or monovinylarene, (2) about 5 to about 50 weight percent, preferably about 5 to about 40 weight percent of acrylic ester copolymer, and (3) about 5 to about 35 weight percent, preferably about 15 to about 30 weight percent of coumarone-indene resin. The ratio of conjugated diene-monovinylarene teleblock copolymer:copolymer of lactone with conjugated diene and/or monovinylarene, can range from 100:0 to 0:100.

The blends of this invention can contain certain other compatible additives to plasticize, extend, lubricate, inhibit or prevent oxidation. Flame retardants, dyes, pigments, etc., can also be added to the mixtures. Such compatible additives are well known in the art and can be incorporated without departing from the scope of the invention.

To prepare the blends of this invention, the polymers can be mechanically blended together in the desired proportions with the aid of any suitable mixing device conventionally used for mixing rubbers or plastics, such as a differential roll mill, a Banbury mixer, or an extruder. To facilitate thorough mixing of the polymers and to develop the desired improved combination of physical properties, the mechanical blending is carried out at sufficiently high temperatures to soften the polymers so that they are thoroughly dispersed and intermingled with each other. The mixing temperature will in general vary with the composition of the blend. Mixing is continued until a uniform blend is obtained. Other methods of blending which are taught in the art, or known to those skilled in the art, can also be used.

EXAMPLE I

This example illustrates the improved resistance to ozone and to oil of ternary polymeric blends comprising butadiene-styrene teleblock copolymer, acrylic ester copolymer, and coumarone-indene resin, compared to binary blends of butadiene-styrene teleblock copolymers plus acrylic ester copolymer, or of butadiene-styrene teleblock copolymer plus coumarone-indene resin.

Polymeric blends were prepared by melt blending the polymers in the desired proportions in a Midget Banbury Mixer at 180 rpm and heated to 120° C. The blends were mixed for 0.5 to 1.0 minutes and dumped at 135° to 180° C. Further mixing was done using a 6 inch roll mill at a temperature of 120° C. Test specimens measuring 6 inches×6 inches×0.08 inches (15.24 cm×15.24 cm×0.20 cm) were compression molded at 175° C. Physical properties of invention and control blends are shown in Table I.

These data illustrate the improved ozone resistance and oil swell resistance of the ternary inventive blends (Runs 4 through 9) compared to the control blends (Runs 1, 2, and 3).

in series, the first reactor having a capacity of 302.8 liters (80 gal), and the second reactor having a capacity of 946.3 liters (250 gal).

| RECIPE 1 | | |
|---|---|---|
| Step I | | |
| Cyclohexane, parts by weight | 800 | |
| Styrene, parts by weight | 25 | |
| n-Butyllithium, mhm$^a$ | 2.4 | |
| Tetrahydrofuran, parts by weight | 0.1 | |
| Polymerization temperature, °C. | 52 | 60$^b$ |
| Polymerization time, minutes | 10 | |
| Step II | | |
| 1,3-Butadiene, parts by weight | 50 | |
| Polymerization temperature, °C. | 60 | 84$^c$ |
| Polymerization time, minutes | 35 | |
| Step III | | |
| ε-Caprolactone, parts by weight | 0.5 | |
| Polymerization temperature, °C. | 84 | |
| Polymerization time, minutes | 5 | |
| Step IV | | |
| Transferred to second reactor and cooled | | |
| Temperature, °C. | 84 | 30 |
| Time, minutes | about 35 | |
| Step V | | |
| ε-Caprolactone, parts by weight | 24.5 | |
| Polymerization temperature, °C. | 30 | |
| Polymerization time, minutes | 35 | |
| Step VI | | |
| Phenyltrichlorosilane, mhm | 0.76 | |
| Reaction temperature, °C. | 30 | |
| Reaction time, minutes | 5 | |

$^a$mhm = Gram millimoles per 100 grams of total monomers.
$^b$Polymerization initiated at 52° C. and polymerization temperature peaked at 60° C.
$^c$1,3-Butadiene added to polymerization reaction mixture at 60° C. and polymerization temperature peaked at 84° C.

Following completion of Step II, a small amount of ε-caprolactone was added to couple the living polymer having a polybutadienyllithium terminal group. This

TABLE I

Physical Properties of Polymer Blends
Weight Percent in Blend$^a$

| | Control Runs | | | Inventive Runs | | | | | |
|---|---|---|---|---|---|---|---|---|---|
| Blends | 1 | 2 | 3 | 4 | 5 | 6 | 7 | 8 | 9 |
| Polymers in Blend | | | | | | | | | |
| Butadiene-styrene copolymer$^b$ | 100 | 70 | 77 | 69 | 66 | 62 | 58 | 54 | 36 |
| Acrylic ester copolymer$^c$ | 0 | 30 | 0 | 8 | 17 | 15 | 25 | 23 | 36 |
| Coumarone-indene resin$^d$ | 0 | 0 | 23 | 23 | 17 | 23 | 17 | 23 | 28 |
| Properties | | | | | | | | | |
| Tensile strength, MPa$^e$ | 13.6 | 11.4 | 32.4 | 28.8 | 26.2 | 22.4 | 13.4 | 17.1 | 10.9 |
| 300% Modulus, MPa$^e$ | 3.3 | 2.6 | 3.7 | 3.9 | 3.4 | 3.8 | 3.0 | 3.6 | 4.0 |
| Swell in ASTM oil #2, %$^f$ | 53.2 | 33.8 | 29.1 | 26.2 | 28.6 | 22.0 | 26.7 | 17.3 | 6.7 |
| Ozone resistance, 6 hr$^g$ | 10/10/10 | 10/10/10 | 10/10/10 | 10/10/10 | 0/8/4 | 10/10/10 | 0/6/6 | 0/0/10 | 0/0/0$^h$ |
| 48 hr | x/x/x | x/x/x | 10/x/x | 10/10/10 | 0/6/2 | 10/10/10 | 0/6/2 | 0/0/6 | 0/0/0$^i$ |
| 14 days | x/x/x | x/x/x | x/x/x | 10/10/10 | 0/10/10 | 10/10/10 | 0/10/8 | 0/0/0 | 0/0/0 |

$^a$All blends also contain 0.5 parts by weight of Irganox 1035 (hindered phenolic antioxidant from Ciba-Geigy) per 100 parts of butadiene-styrene teleblock copolymer plus acrylic ester copolymer.
$^b$Phillips Petroleum Company Solprene ® 416; 70/30 butadiene/styrene radial teleblock copolymer having $M_w/M_n$ of about 150,000/120,000.
$^c$B. F. Goodrich Chemical Company Hycar 4021 polyacrylic rubber having ML-4 (100° C.) of 45-65.
$^d$Neville Chemical Company Cumar Resin LX-509 having a minimum ring and ball softening point of 155° C.
$^e$ASTM D412-75.
$^f$ASTM D471-75.
$^g$Three strips of rubber 0.5 inch (1.27 cm) wide and 5 inch/4 inch/3 inch (12.7 cm/10.2 cm/7.6 cm) in length are maintained in a bent-loop configuration at 40° C. in air containing 50 parts by volume of ozone per 100 million parts of air for the designated length of time, and then rated on a scale of 0 to 10 based on visual examination of the exposed specimens. 0 designates no visual change; 10 designates severe cracking; X designates failure of the specimen.
$^h$8 hours
$^i$24 hours

EXAMPLE II

This example illustrates the preparation of a styrene-butadiene-ε-caprolactone copolymer suitable for use in preparing the blends of this invention.

The polymer was prepared according to Recipe 1 in two jacketed, stirred, stainless steel reactors connected coupled living polymer (some uncoupled living polymer may also be present) was then transferred to a cooled second reactor and the reaction mixture cooled before addition and polymerization of the ε-caprolactone as branches on the coupled living polymer in Step III. Following completion of Step V, the living polymer having polycaprolactonyllithium terminal group was terminated with phenyltrichlorosilane. One part by weight of 2,2'-methylenebis(4-methyl-6-t-butylphenol)antioxidant dissolved in cyclohexane was added to the polymerization mixture prior to recovery of the lactone terpolymer by steam stripping.

The physical properties of the recovered styrene-butadiene-ε-caprolactone block terpolymer are shown in Table II.

TABLE II

Physical Properties of Styrene-Butadiene-ε-Caprolactone Coupled Terpolyme

| | |
|---|---|
| Molecular weight, $M_w{}^a$ | 170,000 |
| Molecular weight, $M_n{}^a$ | 101,000 |
| Heterogeneity index, $M_w/M_n$ | 1.68 |
| Inherent viscosity$^b$ | 1.09 |
| Gel, weight percent$^c$ | 0 |
| Total Styrene, weight percent$^d$ | 27.9 |

$^a$Molecular weights were determined from gel permeation chromatography curves by a procedure described by G. Kraus and C. J. Stacy, J. Poly. Sci. A-2 10, 658 (1972), and G. Kraus and C. J. Stacy, J. Poly. Sci. Symposium No. 43, 329 (1973).
$^b$Inherent viscosity was determined according to a procedure given in U.S. Pat. No. 3,278,508, column 20, Note a with the modification that the solution was not filtered through a sulfur absorption tube but rather through a fritted glass filter stick of grade C porosity and pressured directly into the viscometer.
$^c$Gel determined according to procedure described in U.S. Pat. No. 3,278,508, column 20, Note b.
$^d$Total styrene determined by ultraviolet absorption spectroscopy.

EXAMPLE III

This example illustrates the improved cresent tear strength, reduced heat distortion, and improved resistance to oil and ozone of blends in which the butadiene-styrene teleblock copolymer is partially or totally replaced with a block copolymer of butadiene, styrene, and ε-caprolactone.

Polymeric blends were melt blended and test specimens prepared generally according to the procedure given in Example I. Physical properties of these blends are shown in Table III.

TABLE III

Physical Properties of Blends Containing a Lactone Copolymer

| | Weight Percent in Blend$^a$ | | | | |
|---|---|---|---|---|---|
| | Control Runs | | Inventive Runs | | |
| | 10 | 11 | 12 | 13 | 14 |
| Polymers in Blend | | | | | |
| Butadiene-styrene copolymer$^b$ | 100 | — | 54 | — | 27 |
| Lactone Copolymer$^c$ | — | 100 | — | 54 | 27 |
| Acrylic ester copolymer$^d$ | — | — | 23 | 23 | 23 |
| Coumarone-indene resin$^e$ | — | — | 23 | 23 | 23 |
| Properties | | | | | |
| Tensile strength, MPa$^f$ | 22.4 | 20.4 | 16.9 | 16.6 | 16.7 |
| 300% Modulus, MPa$^f$ | 3.2 | 3.8 | 3.2 | 3.5 | 3.6 |
| Cresent tear (25° C.), kN/m$^g$ | 19.7 | 32.0 | 36.5 | 40.4 | 43.8 |
| Distortion (100° C.), %$^h$ | 82.4 | 80.6 | 40.5, 35.1$^j$ | 36.5, 35.3$^j$ | 14.5, 23.8$^j$ |
| Swell in ASTM oil #2, %$^i$ | 22.3 | 29.2 | 16.5 | 10.8 | 15.3 |
| Ozone resistance, | | | | | |
| 8 hr$^k$ | 10/10/10 | 0/7/10 | 0/1/1 | 0/0/0 | 0/0/0 |
| 24 hr | 10/10/10 | 0/9/10 | 0/1/1 | 0/0/0 | 0/0/0 |

TABLE III-continued

Physical Properties of Blends Containing a Lactone Copolymer

| | Weight Percent in Blend$^a$ | | | | |
|---|---|---|---|---|---|
| | Control Runs | | Inventive Runs | | |
| | 10 | 11 | 12 | 13 | 14 |
| 14 days | X/X/X | 0/10/X | 0/4/3 | 0/0/0 | 0/0/0 |

$^a$All blends also contain 0.5 parts by weight of Irganox 1035 (hindered phenolic antioxidant from Ciba-Geigy) per 100 parts of butadiene-styrene teleblock copolymer and/or styrene-butadiene-ε-caprolactone block copolymer, plus acrylic ester copolymer.
$^b$Phillips Petroleum Company Solprene ® 416; 70/30 butadiene/styrene radial teleblock copolymer having $M_w/M_n$ of about 150,000/120,000.
$^c$Polymer prepared in Example II.
$^d$B. F. Goodrich Chemical Company Hycar 4021 polyacrylic rubber having ML-4 (100° C.) of 45–65.
$^e$Neville Chemical Company Cumar Resin LX-509 having a minimum ring and ball softening point of 155° C.
$^f$ASTM D412-75.
$^g$ASTM D624-73, Die A.
$^h$ASTM D2633-76.
$^i$ASTM D471-75.
$^j$Duplicate determinations.
$^k$See footnote $^g$, Table I of Example I.

These data illustrate the improvement in cresent tear strength, 100° C. distortion, and resistance to oil and ozone when some (Run 14) or all (Run 13) of the butadiene-styrene teleblock copolymer is replaced with a lactone copolymer.

I claim:

1. A composition of matter that is a blend of polymers comprising:
   (a) a block copolymer of lactone with conjugated diene,
   (b) acrylic ester polymer, and
   (c) coumarone-indene resin.

2. A composition of claim 1 wherein (a) is in the range of about 15 to about 90 weight percent, (b) is in the range of about 5 to about 50 weight percent and (c) is in the range of about 5 to about 35 weight percent.

3. A composition of claim 2 wherein (a) is in the range of about 30 to about 70 weight percent, (b) is in the range of about 5 to about 40 weight percent, and (c) is in the range of about 15 to about 30 weight percent.

4. A composition of claim 1 wherein said blend also contains at least one compatible additive chosen from the group consisting of flame retardants, dyes, pigments, and additives for plasticizing, extending, lubricating, or inhibiting oxidation.

5. A composition of claim 2 wherein said blend also contains at least one compatible additive chosen from the group consisting of flame retardants, dyes, pigments and additives for plasticizing, extending, lubricating, or inhibiting oxidation.

6. A composition of claim 3 wherein said blend also contains at least one compatible additive chosen from the group consisting of flame retardants, dyes, pigments, and additives for plasticizing, extending, lubricating, or inhibiting oxidation.

7. A composition of matter that is a blend of polymers comprising:
   (a) a block copolymer of lactone with a monovinyl arene,
   (b) acrylic ester polymer, and
   (c) coumarone-indene resin.

8. A composition of claim 7 wherein (a) is in the range of about 15 to about 90 weight percent, (b) is in the range of about 5 to about 50 weight percent and (c) is in the range of about 5 to about 35 weight percent.

9. A composition of claim 8 wherein (a) is in the range of about 30 to about 70 weight percent, (b) is in the range of about 5 to about 40 weight percent, and (c) is in the range of about 15 to about 30 weight percent.

10. A composition of claim 7 wherein said blend also contains at least one compatible additive chosen from the group consisting of flame retardants, dyes, pigments, and additives for plasticizing, extending, lubricating, or inhibiting oxidation.

11. A composition of claim 8 wherein said blend also contains at least one compatible additive chosen from the group consisting of flame retardants, dyes, pigments, and additives for plasticizing, extending, lubricating, or inhibiting oxidation.

12. A composition of claim 9 wherein said blend also contains at least one compatible additive chosen from the group consisting of flame retardants, dyes, pigments, and additives for plasticizing, extending, lubricating, or inhibiting oxidation.

13. A composition of matter that is a blend of polymers comprising:
(a) a block copolymer of lactone with (1) conjugated diene and (2) monovinyl arene,
(b) acrylic ester polymer, and
(c) coumarone-indene resin.

14. A composition of claim 13 wherein (a) is in the range of about 15 to about 90 weight percent, (b) is in the range of about 5 to about 50 weight percent, and (c) is in the range of about 5 to about 35 weight percent.

15. A composition of claim 14 wherein (a) is in the range of about 30 to about 70 weight percent, (b) is in the range of about 5 to about 40 weight percent, and (c) is in the range of about 15 to about 30 weight percent.

16. A composition of claim 13 wherein said blend also contains at least one compatible additive chosen from the group consisting of flame retardants, dyes, pigments, and additives for plasticizing, extending, lubricating, or inhibiting oxidation.

17. A composition of claim 14 wherein said blend also contains at least one compatible additive chosen from the group consisting of flame retardants, dyes, pigments, and additives for plasticizing, extending, lubricating, or inhibiting oxidation.

18. A composition of claim 15 wherein said blend also contains at least one compatible additive chosen from the group consisting of flame retardants, dyes, pigments, and additives for plasticizing, extending, lubricating, or inhibiting oxidation.

* * * * *